US006052179A

United States Patent [19]
Prohaska et al.

[11] Patent Number: 6,052,179
[45] Date of Patent: Apr. 18, 2000

[54] METHOD AND SYSTEM FOR DETERMINING THE WAVELENGTH OF LIGHT TRANSMITTED THROUGH AN OPTICAL FIBER

[75] Inventors: John D. Prohaska, Torrance; Lothar U. Kempen, Redondo Beach; Robert A. Lieberman, Torrance, all of Calif.

[73] Assignee: Physical Optics Corporation, Torrance, Calif.

[21] Appl. No.: 09/059,739

[22] Filed: Apr. 14, 1998

[51] Int. Cl.[7] ............................................. G01B 9/02
[52] U.S. Cl. .......................... 356/73.1; 356/345; 356/352
[58] Field of Search ..................................... 356/345, 352, 356/73.1

[56] References Cited

U.S. PATENT DOCUMENTS

| | | |
|---|---|---|
| 4,807,950 | 2/1989 | Glenn et al. . |
| 5,380,995 | 1/1995 | Udd et al. . |
| 5,410,404 | 4/1995 | Kersey et al. . |
| 5,591,965 | 1/1997 | Udd . |
| 5,627,927 | 5/1997 | Udd . |
| 5,757,487 | 5/1998 | Kersey ..................................... 356/345 |

*Primary Examiner*—Robert H. Kim
*Attorney, Agent, or Firm*—Nilles & Nilles, S.C.

[57] ABSTRACT

A method of determining the wavelength of light transmitted in an optical fiber comprises the steps of filtering the light using a filter, and then detecting the filtered light, and then determining the wavelength of the filtered light. The filter comprises a fiber grating which is recorded in a portion of the optical fiber. The fiber grating preferably has a modulated index of refraction with a modulation amplitude that varies from a first end to a second end of the fiber grating, and a modulation period defined by a grating constant that varies from the first end to the second end of the fiber grating. The fiber grating at least partially prevents transmission of light within a wavelength spectrum, and prevents transmission of a substantially larger portion of the light at a first end of the wavelength spectrum than at a second end of the wavelength spectrum. Therefore, the wavelength of the filtered light can be determined by determining a proportion of the light which was transmitted by the filter. The proportion of light which is transmitted by the filter is preferably linearly related to the wavelength of the light.

28 Claims, 3 Drawing Sheets

FIG. 5

METHOD AND SYSTEM FOR DETERMINING THE WAVELENGTH OF LIGHT TRANSMITTED THROUGH AN OPTICAL FIBER

BACKGROUND OF THE INVENTION

1. Field of the Invention

This invention relates to methods and systems for determining the wavelength of light transmitted through an optical fiber. In a particularly preferred embodiment, the invention also relates to methods and systems for determining the wavelength of light transmitted through an optical fiber which incorporate a fiber grating with a variably modulated index of refraction.

2. Description of Related Art

It is often useful to be able determine the wavelength of light transmitted through an optical fiber. Many types of fiber optic sensors are known which alter their transmissivity in accordance with a sensed parameter. For example, fiber optic Bragg grating temperature sensors and pressure sensors are known which are generally transmissive but which reflect light at a wavelength that varies according to the temperature or pressure sensed by the sensor. By determining the wavelength of light which is reflected by such a sensor, an indication may be obtained of the temperature or pressure sensed by the sensor.

In practice, the reflection from the sensor consists of light within a narrow-banded spectrum that is centered about an average wavelength. Therefore, the wavelength that is determined is typically the average wavelength of the reflection. In general, however, any wavelength that corresponds to the Bragg reflection and that varies in accordance with the sensed parameter may be determined in order to obtain the temperature or pressure information. For convenience, the wavelength that is determined will now be referred to as the average wavelength, it being understood however that the determined wavelength could also be a wavelength other than the average wavelength.

Various demodulation techniques are known for determining the wavelength of light transmitted through an optical fiber. According to one particular technique, a dispersive coupler is used to split light from an input fiber between two output fibers. Since the coupler is dispersive, light is transmitted to the two output fibers in a manner which is wavelength-dependent. In particular, the coupler has a sinusoidal transmissivity function. Thus, light at wavelengths occurring at maxima of the sinusoid is coupled to one output fiber, light at wavelengths occurring at minima of the sinusoid is coupled to the other output fiber, and light at wavelengths occurring in between maxima and minima is coupled in varying proportions to both optical fibers. Neither output fiber receives all of the wavelengths contained in the light at the input fiber.

The two output fibers are coupled to two photodetectors which respectively measure the intensity of light in each of the two output fibers. The ratio of the total intensity of light in each of the two output fibers is then determined. Given this ratio, the average wavelength of the light can be determined using the known transmission characteristics of the dispersive coupler (namely, the variation of the transmissivity of the dispersive coupler as a function of wavelength). For example, if the ratio of the two intensities is approximately equal to one, then it is known that the average wavelength of the light is at about the middle of the operating spectrum of the dispersive coupler.

This approach has two disadvantages, however. The first disadvantage of this approach is that the relationship between the ratio of the intensities in the two output fibers and the average wavelength of the light is non-linear. As a result, the sensitivity of the demodulation system is greater at some wavelengths and less at other wavelengths. Additionally, the fact that the relationship is non-linear complicates the determination of the average wavelength.

The second disadvantage of this approach is that its dynamic range is limited. In order to be able to uniquely relate a given intensity ratio to a particular average wavelength, this technique can be used only within a range of wavelengths that fits within one half of a period (at most, less in practice) of the sinusoidal transmission function of the dispersive coupler. However, the range of wavelengths which can be fit into one half of the period of the sinusoidal transmission function is limited by the physics behind the construction of the dispersive coupler.

Thus, what is needed is an improved method and system for determining the average wavelength of light transmitted through an optical fiber. In particular, what is needed is a method and system in which a linear relationship exists between measured intensity and the average wavelength of the light. What is also need is a method and system in which the range of wavelengths which can be demodulated is much larger than in existing systems.

BRIEF SUMMARY OF THE INVENTION

The present invention overcomes these drawbacks of the prior art. In accordance with one aspect of the invention, the present invention provides a system comprising a sensor, a filter, a photodetector, and a signal processing unit. The sensor has an output with a wavelength which varies in accordance with a parameter sensed by the sensor. The filter filters the output of the sensor and is formed of a fiber grating recorded in an optical fiber. The fiber grating has a modulated index of refraction with (1) a modulation amplitude that substantially varies from a first end to a second end of the fiber grating, and (2) a modulation period defined by a grating constant that substantially varies from the first end to the second end of the fiber grating.

The photodetector is optically coupled to the sensor by way of the optical fiber. The photodetector detects the filtered output of the sensor, and has an output which varies in accordance with light intensity detected by the photodetector. The signal processing unit is coupled to the photodetector, and determines the wavelength of the output of the sensor based on the output of the photodetector.

In a particularly preferred embodiment, the signal processing unit compares the output of the photodetector to the output of an additional photodetector to determine a proportion of the light which was transmitted by the fiber grating. The signal processing unit then determines the wavelength of the light based on the proportion of the light which was transmitted by the filter. Preferably, the transmissivity of the fiber grating is substantially linearly related to wavelength, so that there is a linear relationship between the proportion of light transmitted by the filter and the wavelength of the light.

In accordance with another aspect of the invention, the present invention provides a method of determining a wavelength of light transmitted in an optical fiber. The method comprises the steps of filtering the light using a filter, and then detecting the filtered light, and then determining the wavelength of the filtered light.

The filter comprises a fiber grating which is recorded in a portion of the optical fiber. The fiber grating may be recorded, for example, by recording a diffraction pattern of a recording mask in the optical fiber, which is photosensitive. The fiber grating at least partially prevents transmission of light within a wavelength spectrum, and prevents transmission of a substantially larger portion of the light at a first end of the wavelength spectrum than at a second end of the wavelength spectrum.

The step of determining the average wavelength of the filtered light includes the steps of determining a proportion of the light which was transmitted by the filter and determining the wavelength of the light within the wavelength spectrum based on the proportion of the light which was transmitted by the filter.

Advantageously, the present invention provides a method and system in which the range of wavelengths that can be determined is much larger than in existing systems. The fiber grating can be recorded so as to have a grating constant which continuously increases from a minimum value at one end of the filter to a maximum value at the other end. The modulation amplitude for the modulation of the index of refraction can then be adjusted as necessary so that the reflectivity/transmissivity of the filter gradually increases or decreases throughout the range of wavelengths defined by the range of values for the grating constant. The resulting filter can therefore be used for determining the wavelength value within a very large range of possible wavelength values. Additionally, the filter can be given a linear transmissivity function, such that the proportion of light which is transmitted by the filter is linearly related to the wavelength of the light.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

Figure 1:
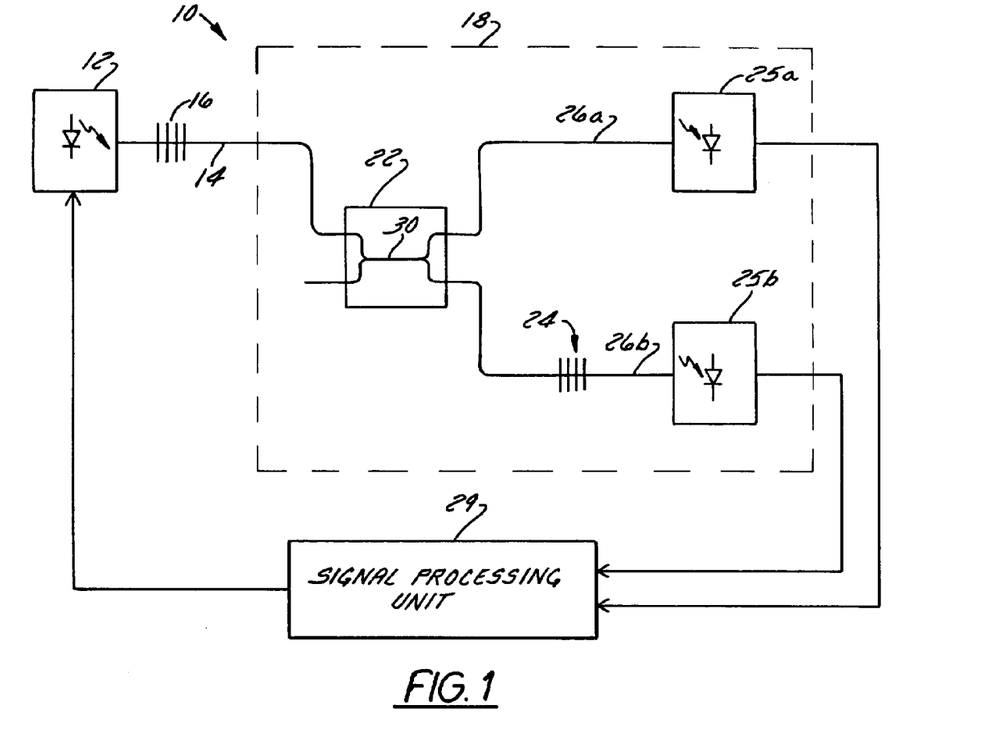
FIG. 1 is a schematic diagram of a system which determines the average wavelength of light transmitted through an optical fiber, in accordance with one embodiment of the invention.

Referring now to FIG. 1, a schematic diagram of a system 10 which determines the average wavelength of light transmitted through an optical fiber is illustrated. The system 10 comprises an illumination source 12, an optical fiber 14, a sensor 16 which is disposed along the optical fiber 14, a detector 18 which is connected to a distal end of the optical fiber 14, and a signal processing unit 29 which controls the illumination source 12 and which processes outputs from the detector 18. The signal processing unit 29 uses the outputs from the detector 18 to determine the average wavelength of light output by the optical fiber 14. The signal processing unit 29 could, for example, be a computer, a digital signal processor, an analog signal processor, or any other suitable signal processing unit. Also, as previously noted, the signal processing unit could in general be used to determine any wavelength (not necessarily just the average wavelength) that varies in accordance with a sensed parameter.

The detector 18 further comprises a non-dispersive coupler 22, a demodulating filter 24, first and second photodetectors 25a and 25b, and first and second optical fibers 26a and 26b. The first and second photodetectors 25a and 25b are optically coupled to the coupler 22 by way of the optical fibers 26a and 26b, respectively. As described in greater detail below, the filter 24 is formed of a fiber grating which is recorded in the optical fiber 26b. The filter 24 is referred to as a "demodulating" filter because it is used to extract information from the output signal of the sensor 16. It should be noted that the "modulation" of the index of refraction and the "demodulation" of the output signal of the sensor 16 are distinct and there is no "modulation-demodulation" relationship between them.

The light produced by the illumination source 12 is transmitted through the optical fiber 14 to the sensor 16. The illumination source 12 is preferably a broadband source such as a light emitting diode. The sensor 16 has an output with an average wavelength that varies in accordance with a parameter sensed by the sensor 16. The sensor 16 could, for example, be a Bragg grating temperature or pressure sensor which is generally transmissive but which reflects light at a wavelength that varies according to the temperature or pressure applied to the sensor. In general, however, the sensor 16 could be any other type of sensor that produces a signal having an unknown average wavelength which it is desired to determine.

Figure 5:
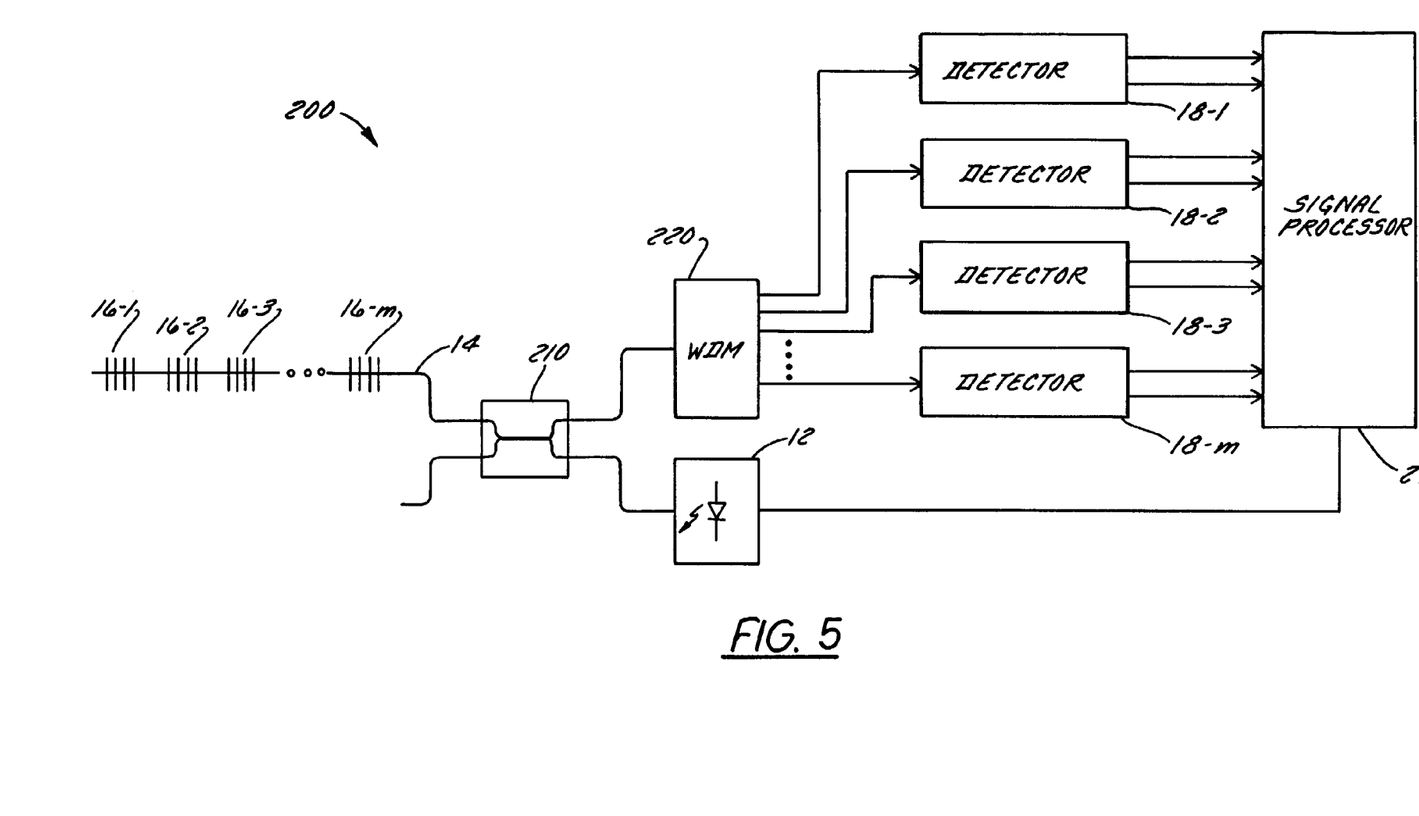
FIG. 5 is a schematic diagram of a multi-point sensing system which incorporates a plurality of the sensors and detectors illustrated in FIG. 1.

The output of the sensor 16 is transmitted through the optical fiber 14 to the coupler 22. The coupler 22 contains a region 30 in which portions of the fibers 14, 26a and 26b are fused together. In particular, the optical fibers 14 and 26a may be formed of one continuous optical fiber, part of which forms the optical fiber 14 and part of which forms the optical fiber 26a. This continuous optical fiber could then be fused somewhere along its length to the optical fiber 26b. Alternatively, the optical fibers 14, 26a, and 26b could all be distinct optical fibers which are fusion spliced to various fiber optic leads of the coupler 22. Other arrangements are also possible. In practice, a similarly arranged non-dispersive coupler may also be provided in conjunction with the sensor 16 (as shown in FIG. 5), especially if the sensor 16 is formed of a Bragg grating.

The coupler 22 splits the light from the optical fiber 14 between the optical fibers 26a and 26b. Preferably, the light is split equally between the two optical fibers 26a and 26b. Additionally, since the coupler 22 is a non-dispersive coupler, the light is split between the optical fibers 26a and 26b in wavelength-independent fashion.

The light which is transmitted in the optical fiber 26a is detected by the photodetector 25a. The photodetector 25a is coupled to the signal processing unit 29 and provides the signal processing unit 29 with electrical signals indicative of the intensity sensed by the photodetector 25a.

Figure 2A:
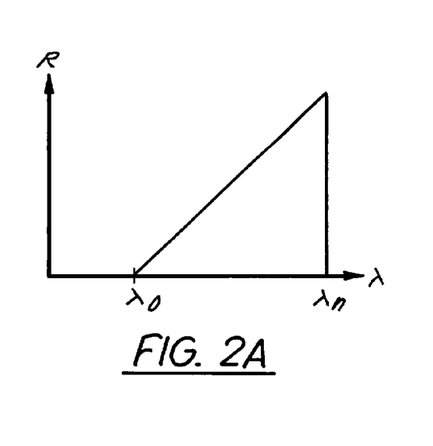
FIGS. 2A and 2B are graphs showing the reflectivity and transmissivity, respectively, of a demodulating filter used in the system of FIG. 1.
Figure 2B:
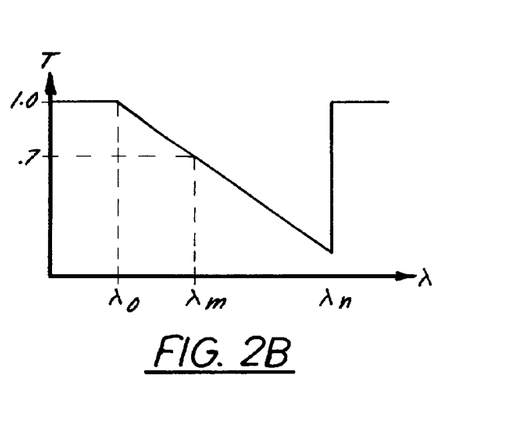

The light which is transmitted in the optical fiber 26b is filtered by the filter 24. The reflectivity and transmissivity characteristics of the filter 24 are shown in FIGS. 2A and 2B, respectively. As shown, the extent to which light is reflected or transmitted by the filter 24, and therefore by the optical fiber 26b, is directly dependent on the wavelength of the light. Inside of the wavelength spectrum $\lambda_0$ to $\lambda_n$ (which is the operating range of the filter 24), the transmissivity of the filter 24 preferably varies linearly with the wavelength of the light. Outside of the wavelength spectrum $\lambda_0$ to $\lambda_n$, the filter is completely transmissive. The optical and material properties of the filter 24 are described in greater detail below in conjunction with FIGS. 3, 4A and 4B.

The output of the filter 24 is transmitted to the photodetector 25b, which detects the light. The photodetector 25b is coupled to the signal processing unit 29 and provides the signal processing unit 29 with electrical signals indicative of the intensity sensed by the photodetector 25b.

The signal processing unit 29, which stores information pertaining to the reflectivity/transmissivity of the filter 24, uses the outputs from the detector 18 to determine the average wavelength of light output by the optical fiber 14. In particular, since the transmissivity of the filter 24 varies linearly with the wavelength of the light within the wavelength spectrum $\lambda_0$ to $\lambda_n$, the average wavelength of the light can be easily determined by determining a proportion of light transmitted by the filter 24. For example, as shown in FIG. 2B, if 70% of the light is transmitted by the filter 24, then it can be assumed that the average wavelength of the light is $\lambda_m$. Of course, since all of the light is either transmitted or reflected, the amount of light transmitted can also be determined by default by determining the amount of light which is reflected.

The average wavelength can then be converted in a known manner to a numerical value which is useful in conjunction with the particular sensor used. For example, if the sensor 16 is a pressure sensor, a strain value may be calculated by calculating a change in wavelength, dividing by the original wavelength, and multiplying by a constant.

It should be noted that is also possible to implement the system 10 without the photodetector 25a. The purpose of the photodetector 25a is to create a reference against which the intensity detected by the photodetector 25b may be compared. However, for example, if all source fluctuations in the illumination source 12 are eliminated, then the intensity of the light which is output by sensor 16 should be constant and therefore may be predetermined. In this event, the output of the filter 24 may be compared with the intensity which would be expected to be observed without filtering. The advantage of using the photodetector 25a is simply that it makes the system 10 relatively insensitive to fluctuations in intensity observed at the output of the filter 24 which are not caused by wavelength shifts.

It should also be noted that the system 10 may be used not only in conjunction with systems in which the parameter sensed by the sensor 16 is relatively constant, but also in conjunction with systems in which the parameter sensed by the sensor 16 is rapidly varying. Indeed, another one of the advantages of the present invention is that the filter 24, and thus the system 10 as a whole, has a very fast response time.

Figure 3:
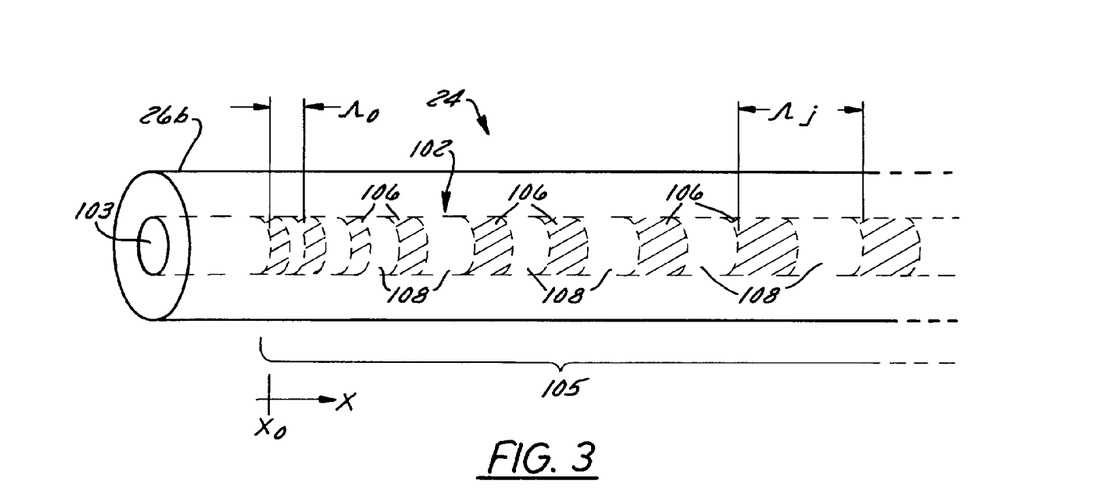
FIG. 3 is a perspective view of the demodulating filter used in the system of FIG. 1.
Figure 4A:
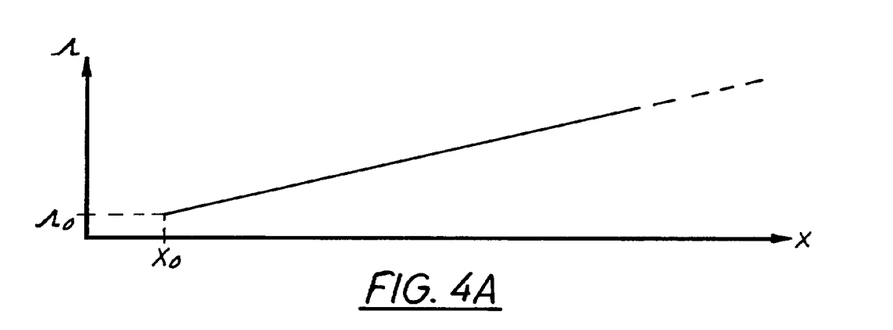
FIGS. 4A and 4B are graphs showing the variation of a modulation frequency and a modulation amplitude for the index of refraction of a fiber grating which forms the demodulating filter used in the system of FIG. 1.
Figure 4B:
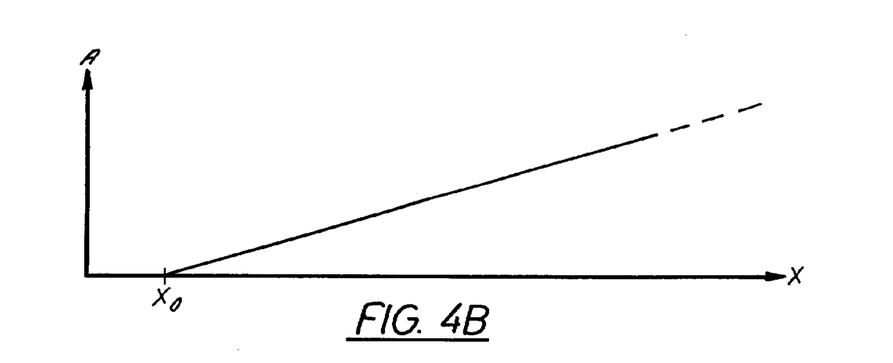

Referring now to also to FIGS. 3, 4A and 4B, the filter 24 is shown in greater detail. FIG. 3 is a perspective view of the filter 24. The filter 24 is constructed by recording a fiber grating 102 in the optical fiber 26b. The fiber grating 102 comprises a periodic or semi-periodic refractive index structure in a core 103 of the optical fiber 26b. The refractive index structure is formed by changes in the index of refraction along the portion 105 of the optical fiber 26b. In particular, the index of refraction in the optical fiber 26b is modulated sinusoidally along the length of the optical fiber 26b. In FIG. 3, shaded regions 106 are used to indicate the "upper halves" of the sinusoid where the index of refraction is higher, and unshaded regions 108 are used to indicate the "lower halves" of the sinusoid where the index of refraction is lower. Of course, the recording of the fiber grating 102 in the optical fiber 26b does not cause changes in the shape of the core 103 of the optical fiber 26b.

For purposes of illustration, the longitudinal dimensions of the regions 106 and 108 have been greatly exaggerated in FIG. 3 as compared to the thickness of the optical fiber 26b. For light having a wavelength of about 1.5 mm, for example, the longitudinal dimension of the regions 106 and 108 is on the order of 0.5 mm. Assuming the length of the fiber grating 102 is on the order of several centimeters, there are tens of thousands of regions 106 and 108 in the fiber grating 102. The portion 105 of the optical fiber 26b therefore extends far to the right in FIG. 3.

In general, a resonance condition is created in an optical structure when, at a particular wavelength of the light, a refractive index structure has a period which corresponds to the wavelength of the light. The resonance condition which is thereby created causes the light to reflect backwards. This is known as the Bragg condition, and is stated mathematically as follows:

$$\lambda = 2n_{eff}\Lambda \qquad (1)$$

where $\lambda$ is the wavelength of light, $n_{eff}$ is the index of refraction, and $\Lambda$ is the grating constant which causes the light of wavelength $\lambda$ to reflect backwards.

In the fiber grating 102 of FIG. 3, the grating constant $\Lambda$ varies from one end of the portion 105 to the other end of the portion 105. The fiber grating 102 is therefore referred to as being "chirped," since it has a modulation frequency $(1/\Lambda)$ that changes along the length of the optical fiber 26b. As described in greater detail below, the variation of the grating constant $\Lambda$ along the length of optical fiber 26b causes the fiber grating 102 to reflect light throughout a range of wavelengths.

The variation of the grating constant $\Lambda$ is illustrated more clearly in FIG. 4A. The grating constant $\Lambda$ gradually increases over the length of the optical fiber 12. In the preferred embodiment, the grating constant $\Lambda$ increases linearly, however, the grating constant $\Lambda$ could also increase in a non-linear fashion. The grating constant $\Lambda$ may, for example, vary from about 1030 nanometers to about 1070 nanometers for a demodulating filter which is several centimeters in length.

In addition to the grating constant $\Lambda$ varying along the length of the fiber, the modulation amplitude A of the index of refraction also varies. As described in greater detail below, the variation of the modulation amplitude A along the length of optical fiber 26b causes the fiber grating 102 to reflect different amounts of light throughout the range wavelengths in which the fiber grating 102 is reflective.

FIG. 4B shows the variation of the modulation amplitude A of the index of refraction $n_{eff}$ over the length of the optical fiber 26b for the fiber grating 102. (The variation of the modulation amplitude A is not observable in FIG. 3 since the index refraction is only indicated as being "high" or "low"

by the regions 106 and 108, and the particular amplitude of the index of refraction is not shown.

The modulation amplitude A gradually increases over the length of the optical fiber 26b. In the preferred embodiment, the modulation amplitude A increases linearly. Again, however, the modulation amplitude A could also increase in a non-linear fashion. It should also be noted that the grating constant Λ and the modulation amplitude could be inversely related, such that one of the parameters increases while the other parameter decreases over the length of the optical fiber 26b. The modulation amplitude A may, for example, vary such that the reflectivity varies from about zero to about one hundred percent.

Referring again to FIGS. 2A and 2B, the variations in the grating constant Λ and the modulation amplitude A induce optical properties in the filter 24 which are now described in greater detail. As previously noted, the recording of the fiber grating 102 is performed in the portion 105 on the optical fiber 26b. Outside of the portion 105, the index of refraction is not modulated and therefore the optical fiber 26b is purely transmissive. The fiber grating 102 is recorded beginning at a location $X_0$ at a first end of the optical fiber 26b with an initial grating constant $\Lambda_0$. As shown in FIG. 2A, the reflectivity of the filter 24 assumes a non-zero value at the wavelength $\lambda_0$ (the wavelength $\lambda_0$ corresponds to the grating constant $\Lambda_0$ in the manner defined by Eq. (1)). The reflectivity of the filter 24 for the wavelength $\lambda_0$ is extremely low since the modulation amplitude A of the index of refraction is extremely small at the location $X_0$.

Further down the filter 24, the grating constant Λ begins to increase (FIG. 4A). Therefore, the wavelength of light which the filter 24 acts upon at a given location begins to increase. Simultaneously, the modulation amplitude A of the index of refraction begins to increase (FIG. 4B), resulting in an increase in the reflectivity of the filter 24 at each wavelength (FIG. 2A). At a location on an opposite end of the filter 24 (not illustrated) the grating constant has a value $\Lambda_n$. At wavelengths higher than $\lambda_n$ (corresponding to $\Lambda_n$), the modulation of the index of refraction terminates and the filter 24 again becomes purely transmissive.

In the preferred embodiment, the filter 24 is generally transmissive at one end of the spectrum and is generally non-transmissive at the other end of the spectrum. In general, however, the transmissivity could be varied such that any two points between zero and one hundred percent are the minimum and maximum. All that is truly required for the proper operation of a demodulation system, for example, is that different portions of the wavelength spectrum be substantially more reflective (or transmissive) than other portions of the wavelength spectrum, such that the demodulation system is useful for distinguishing optical signals of different wavelengths.

In order to achieve the varying grating constant Λ and the varying modulation amplitude, the filter 24 is fabricated in the following manner. The filter 24 is created using an optical fiber 26b that is photosensitive to ultraviolet light, such as germania-doped silica, such that the material in the optical fiber 26b changes its refractive index when illuminated by ultraviolet light (i.e., 244 nanometer light). The optical fiber 26b is held fixed while a mask is placed very close to the optical fiber 26b (such that the two are almost in contact). The mask has a chirp that creates a near-field diffraction or interference pattern which corresponds to the fiber grating 102.

In order to record the fiber grating 102, the mask is transversely illuminated with an ultraviolet laser. The light diffracts from the mask creating an interference pattern which exposes the optical fiber 26b with the interference pattern. Due to the photosensitivity of the optical fiber 26b, the interference pattern is transferred to the optical fiber 26b and induces the refractive index structure. In order to vary the modulation amplitude of the index of refraction along the length of the optical fiber 26b, the mask is further provided with an intensity transmission which is graded across the mask in a manner which corresponds to the desired variation of the modulation amplitude.

Another way to vary the modulation amplitude is to move a shutter across the laser beam as a function of time during the exposure. Initially, therefore, the shutter is completely open and, as time progresses, the shutter eclipses increasing portions of the laser beam. The portion of the fiber grating 102 which experiences only a minor eclipse will have a longer exposure time. In this manner, the shutter induces a gradient which causes the desired variation in the modulation amplitude.

Referring now to FIG. 5, a schematic diagram of a multi-point sensing system 200 which incorporates a plurality of the sensors 16 and the detectors 18 of FIG. 1 is illustrated. In particular, the system 200 includes a plurality of sensors 16-1, 16-2, 16-3 to 16-m and a corresponding plurality of detectors 18-1, 18-2, 18-3 to 18-m. The system 200 also includes the illumination source 12 which is coupled to the sensors 16-1 to 16-m by way of a non-dispersive coupler 210. The plurality of sensors 16-1 to 16-m are coupled to the plurality of detectors 18-1 to 18-m by way of the non-dispersive coupler 210 and a wavelength division multiplexer (WDM) 220. Finally, the system also includes the signal processing unit 29.

In operation, light from the illumination source 12 is transmitted to the sensors 16-1 to 16-m by way of the non-dispersive coupler 210. The sensors 16-1 to 16-m are Bragg grating sensors each of which has a different range of grating constants Λ, such that the sensors 16-1 to 16-m operate within different (but preferably adjacent) wavelength ranges. As a result, each of the sensors 16-1 to 16-m reflects only a portion of the light it receives, and transmits the rest to other sensors further down the optical fiber 14.

The reflected light from the sensors 16-1 to 16-m is received by the wavelength division multiplexer 220. The wavelength division multiplexer 220 has m outputs which each correspond to one of the sensors 16-1 to 16-m. The wavelength division multiplexer 220 associates reflections from the sensors 16-1 to 16-m with a particular one of the outputs on the basis of the wavelength of a given reflection. The reflections from the sensors 16-1 to 16-m are then transmitted to the detectors 18-1 to 18-m, which determine the average wavelength of each reflection in the manner previously described in conjunction with FIG. 1.

Advantageously, the range of wavelengths that can be determined using the present invention is much larger than in existing systems. The fiber grating can be recorded so as to have a grating constant which continuously increases from a minimum value at one end of the filter to a maximum value at the other end. The modulation amplitude for the modulation of the index of refraction can then be adjusted as necessary so that the reflectivity/transmissivity of the filter gradually increases or decreases throughout the range of wavelengths defined by the range of values for the grating constant. The resulting demodulating filter can therefore be used for determining a wavelength value within a very large range of possible wavelength values. Additionally, the demodulating filter can be given a linear transmissivity function, such that the proportion of light which is transmitted by the filter is linearly related to the value of the wavelength of the light. Finally, the demodulating filter can be used in conjunction with a multi-point sensing system.

Many changes and modifications may be made to the present invention without departing from the spirit thereof. The scope of these and other changes will become apparent from the appended claims.

We claim:

1. A system comprising:
   (A) a sensor, the sensor having an output with a wavelength which varies in accordance with a parameter sensed by the sensor;
   (B) a filter, the filter filtering the output of the sensor, to produce a filtered output the filter being formed of a fiber grating recorded in an optical fiber, the fiber grating having a modulated index of refraction with (1) a modulation amplitude that substantially varies from a first end to a second end of the fiber grating, and (2) a modulation period defined by a grating constant that substantially varies from the first end to the second end of the fiber grating;
   (C) a photodetector, the photodetector being optically coupled to the sensor by way of the filter and the optical fiber, the photodetector detecting the filtered output of the sensor, and the photodetector having an output which varies in accordance with light intensity detected by the photodetector; and
   (D) a signal processing unit, the signal processing unit being coupled to the photodetector, and the signal processing unit determining the wavelength of the output of the sensor based on the output of the photodetector.

2. A system as defined in claim 1,
   wherein the optical fiber is a first optical fiber;
   wherein the photodetector is a first photodetector; and
   wherein the system further includes
   (1) a coupler, the coupler being optically disposed between the filter and the sensor, the coupler splitting light received from the sensor between the first optical fiber and a second optical fiber,
   (2) a second photodetector, the second photodetector being optically coupled to the sensor by way of the second optical fiber and the coupler, and the second photodetector having an output which varies in accordance with light intensity detected by the second photodetector.

3. A system as defined in claim 2,
   wherein the signal processing unit compares the output of the first photodetector to the output of the second photodetector to determine a proportion of the light which was transmitted by the filter; and
   wherein the signal processing unit determines the wavelength of the light based on the proportion of the light which was transmitted by the filter.

4. A system as defined in claim 1, wherein the varying modulation amplitude and the varying modulation period cooperate so as to make the optical fiber (1) transmissive within a wavelength spectrum, and (2) generally non-transmissive at a first end of the wavelength spectrum and generally transmissive at a second end of the wavelength spectrum.

5. A system as defined in claim 1, wherein the signal processing unit determines a proportion of the light which is transmitted by the fiber grating, and wherein the signal processing unit determines the wavelength of the light based on the proportion of the light which is transmitted by the filter.

6. A system as defined in claim 5, wherein the varying modulation amplitude and the varying modulation period cooperate so as to make the proportion of light which is transmitted by the fiber grating linearly related to the value of the wavelength of the light within the wavelength spectrum.

7. A system as defined in claim 6, wherein the sensor is a Bragg grating sensor which is generally transmissive but which reflects light at a wavelength that varies in accordance with the parameter sensed by the sensor.

8. A method of determining a wavelength of light transmitted in an optical fiber, the method comprising the steps of
   (A) sensing a parameter with a sensor, the sensor producing an output at the wavelength of light transmitted in the optical fiber, the wavelength of light varying in accordance with the parameter sensed by the sensor; then
   (B) filtering the light using a filter, the filter comprising a fiber grating which is recorded in a portion of the optical fiber, the fiber grating at least partially preventing transmission of light within a wavelength spectrum, the fiber grating preventing transmission of a substantially larger portion of the light at a first end of the wavelength spectrum than at a second end of the wavelength spectrum; then
   (C) detecting the filtered light; and then
   (D) determining the wavelength of the filtered light, including
   (1) determining a proportion of the light which was transmitted by the filter during the filtering step (B),
   (2) determining the wavelength of the light within the wavelength spectrum based on the proportion of the light which was transmitted by the filter during the filtering step (B).

9. A method as defined in claim 8,
   wherein the optical fiber is a first optical fiber;
   wherein the method further comprises the steps of
   (1) splitting, before the performance of the filtering step (B), light from the sensor into first and second portions, the first portion of the light from the sensor being the light transmitted in the first optical fiber, the second portion of the light from the sensor being transmitted in a second optical fiber, and
   (2) detecting the second portion of the light; and
   wherein the step of determining the proportion of The light which was transmitted by the filter further comprises the step of comparing the intensity of the filtered first portion of the light with the intensity of the second portion of the light.

10. A method as defined in claim 9, wherein the step of determining the wavelength of the light within the wavelength spectrum based on the proportion of the light which was transmitted by the filter further comprises the step of comparing (1) stored information pertaining to the transmissive characteristics of the filter with (2) information obtained from the comparison of the intensity of the filtered first portion of the light with the intensity of the second portion of the light.

11. A method as defined in claim 8, wherein the fiber grating of the filter used during step (C) has a modulated index of refraction with a modulation amplitude that varies from a first end to a second end of the fiber grating, and a modulation period defined by a grating constant that varies from the first end to the second end of the fiber grating.

12. A method as defined in claim 8 wherein, during the filtering step (B), the proportion of light which is transmitted is linearly related to the value of the wavelength of the light within the wavelength spectrum.

13. A system comprising:
(A) a sensor, the sensor having an output with a wavelength which varies in accordance with a parameter sensed by the sensor;
(B) a filter, the filter filtering the output of the sensor to produce a filtered output, the filter being formed of a fiber grating recorded in an optical fiber, the fiber grating having a modulated index of refraction with (1) a modulation amplitude that substantially varies from a first end to a second end of the fiber grating, and (2) a modulation period defined by a grating constant that substantially varies from the first end to the second end of the fiber grating, the varying modulation amplitude and the varying modulation period cooperating to make the optical fiber (1) transmissive within a wavelength spectrum, and (2) substantially more transmissive at a first end of the wavelength spectrum than at a second end of the wavelength spectrum;
(C) a photodetector, the photodetector being optically coupled to the sensor by way of the filter and the optical fiber, the photodetector detecting the filtered output of the sensor, and the photodetector having an output which varies in accordance with light intensity detected by the photodetector; and
(D) a signal processing unit, the signal processing unit being coupled to the photo-detector, and the signal processing unit determining information pertaining to the sensed parameter based on the output of the photodetector.

14. A system as defined in claim 13, wherein the varying modulation amplitude and the varying modulation period cooperate so as to make the variation in the transmissivity of the fiber grating substantially linearly related to the value of the wavelength within the wavelength spectrum.

15. A system as defined in claim 13 wherein, at the first end of the wavelength spectrum, the fiber grating is substantially entirely non-transmissive.

16. A system as defined in claim 15 wherein, at the second end of the wavelength spectrum, the fiber grating is substantially entirely transmissive.

17. A system as defined in claim 13, wherein the variation of the modulation period from the first end to the second end of the fiber grating corresponds to a diffraction pattern of a recording mask which records the fiber gating.

18. A system as defined in claim 17, wherein the variation of the modulation amplitude from the first end to the second end of the fiber grating corresponds to a graded intensity of the recording mask.

19. A system as defined in claim 17, wherein the variation of the modulation amplitude from the first end to the second end of the fiber grating corresponds to movement of a shutter which cooperates with the mask.

20. A system comprising:
(A) a sensor, the sensor having an output with a wavelength which varies in accordance with a parameter sensed by the sensor;
(B) a first optical fiber;
(C) a non-dispersive coupler, the coupler having an input which is optically coupled to the sensor by way of the first optical fiber, and the coupler having first and second outputs;
(D) a second optical fiber;
(E) a first photodetector, the first photodetector being optically coupled to the first output of the coupler by way of the second optical fiber, and the first photodetector having an output which varies in accordance with light intensity detected by the first photodetector;
(F) a third optical fiber;
(G) a fiber grating, the fiber grating being recorded in a portion of the third optical fiber;
(H) a second photodetector, the second photodetector being optically coupled to the second output of the coupler by way of the third optical fiber, and the second photodetector having an output which varies in accordance with light intensity detected by the second photodetector;
(I) a signal processing unit, the signal processing unit being coupled to the first and second photodetectors, the signal processing unit determining the wavelength of the output of the sensor based on the output of the first and second photodetectors.

21. A system as defined in claim 20, wherein the fiber grating has a modulated index of refraction with a modulation amplitude that varies from a first end to a second end of the fiber grating and a modulation period defined by a grating constant that varies from the first end to the second end of the fiber grating, the fiber grating at least partially preventing transmission of light within a wavelength spectrum, the fiber grating preventing transmission of a substantially larger portion of the light at a first end of the wavelength spectrum than at a second end of the wavelength spectrum.

22. A system as defined in claim 21, wherein the varying modulation amplitude and the varying modulation period cooperate so as to make the transmissivity of the fiber grating substantially linearly related to wavelength within the wavelength spectrum.

23. A system as defined in claim 20, wherein the system is a multi-point sensing system and further comprises a plurality of additional fiber gratings recorded in other portions of the third optical fiber.

24. A system as defined in claim 20, wherein the signal processing unit determines a proportion of the light which is transmitted by the fiber grating, wherein the proportion of light which is transmitted by the fiber grating is linearly related to the value of the wavelength of the light within the wavelength spectrum, and wherein the signal processing unit determines the wavelength of the light based on the proportion of the light which is transmitted by the fiber grating.

25. A system as defined in claim 1, further comprising a broadband light source, the broadband light source being optically coupled to the sensor and transmitting light to the sensor.

26. A system as defined in claim 1, wherein for at least some wavelengths the filter is substantially entirely non-transmissive.

27. A method of sensing a parameter comprising the steps of
(A) sensing the parameter with a sensor, the sensor producing an output at a wavelength of light transmitted which varies in accordance with the parameter sensed by the sensor, then
(B) splitting the output of the sensor into first and second portions transmitted in first and second optical fibers, the first optical fiber being optically coupled to a first photodetector and the second optical fiber being optically coupled to a second photodetector; then
(C) filtering the first portion of the output of the sensor using a filter, and leaving the second portion of the output of the sensor unfiltered by the filter, the filter having a transmissivity which substantially varies as a function of wavelength; then (D) detecting the first portion of the output with the first photodetector and detecting the second portion of the output with the second photodetector; and then (E) determining information pertaining to the sensed parameter, including
  (1) comparing the outputs of the first and second photodetectors,
  (2) determining a proportion of the light which was transmitted by the filter during the filtering step (C) based on the comparing step (E)(1),
  (3) determining the information pertaining to the sensed parameter based on the proportion of the light which was transmitted by the filter during the filtering step (C).

28. A method as defined in claim 27, wherein a fiber grating of the filter used during step (C) has a modulated index of refraction with a modulation amplitude that substantially varies from a first end to a second end of the fiber grating, and a modulation period defined by a grating constant that substantially varies from the first end to the second end of the fiber grating.

* * * * *